June 10, 1958  P. J. KRAAYEVELD  2,838,679
CIRCUIT FOR MEASURING RADIATION INTENSITIES
Filed Aug. 28, 1953

INVENTOR
PIETER JOHANNES KRAAYEVELD
BY
AGENT

United States Patent Office 2,838,679
Patented June 10, 1958

2,838,679

CIRCUIT FOR MEASURING RADIATION INTENSITIES

Pieter Johannes Kraayeveld, Amsterdam, Netherlands, assignor, by mesne assignments, to North American Philips Company, Inc., New York, N. Y., a corporation of Delaware Application August 28, 1953, Serial No. 377,063

Claims priority, application Netherlands August 30, 1952

4 Claims. (Cl. 250—83.6)

The present invention relates to circuit arrangements for measuring radiation intensities. More particularly, the invention relates to circuits for measuring radiation intensities with the use of a Geiger-Muller counter as a detector which is connected in series with an extinction resistor, provision being made of an instrument for indicating the mean current flowing through the Geiger-Muller counter.

The object of the invention is to provide a circuit which permits the measuring of large doses of radiation in a simple manner.

By a suitable choice of the dimensions of the counter tube, the composition of the filling gas and the arrangement of the electrodes, it is possible to realize a comparatively large transport of charge per pulse in the tube, thus permitting direct measurement, that is, measurement without interposed amplifiers. It has furthermore been found possible for the so-called plateau of the tube, that is, the relationship between the number of pulses per unit time and the voltage applied to the tube at constant radiation intensity, to be chosen very long, so that for example the number of pulses per unit time through a voltage range of 1000 volts is substantially independent of the voltage applied to the tube.

The invention utilizes this circumstance for obtaining a simple circuit for measuring radiation intensities by Geiger-Muller counters, which is adapted to be used within very broad limits of the number of pulses occurring per unit time in the tube and which also, in the case of a large number of pulses per unit time, permits the satisfactory reading of the ammeter.

In accordance with the present invention, a circuit of the type described comprises a second resistor, together with a smoothing capacitor, which elements are connected in such manner that the voltage at the terminals of the Geiger-Muller counter decreases at increasing doses.

For this purpose a second resistor may be connected in series with the series-combination of the Geiger-Muller counter and the extinction resistor, a capacitor being provided in parallel wit the first-mentioned series-combination.

As an alternative, the parallel combination of a second resistor and a capacitor may be provided in series with the series-combination of the Geiger-Muller counter and the extinction resistor.

In each case, the voltage set up at the terminals of the Geiger-Muller counter decreases at increasing radiation doses. The transport of charge in the tube per pulse thus also decreases and instead of a linear relationship between the mean current strength indicated by the instrument and the number of pulses, there is a much smaller increase in current strength at an increasing number of pulses.

The various elements are preferably so proportioned that the said relationship becomes logarithmic.

An improvement of the scale division of the instrument may be obtained by utilizing a plurality of Geiger-Muller counters of different sensitivities, each comprising an extinction resistor, the circuit of each counter otherwise being arranged in the manner above described. However, in this case a single common ammeter is used for measuring the sum of all discharge currents.

In order that the invention may be readily carried into effect, it will now be described with reference to the accompanying drawing, wherein.

Figure 1:
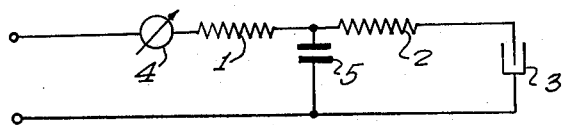
Fig. 1 is a schematic diagram of a preferred embodiment of the circuit arrangement of the present invention.

In the circuit shown in Fig. 1, a Geiger-Muller counter 3 is connected in series with an ammeter 4, resistors 1 and 2 being connected to a direct current supply source of as constant a voltage as possible. The resistor 2 is the conventional extinction resistor. The voltage of the supply may be of the order of magnitude of 1000 volts. The extinction resistor 2 is required to extinguish the tube after the occurrence of a current pulse.

A capacitor 5 is included between the common point of the resistors 1 and 2 and that terminal of the voltage source which is connected to the cathode of the Geiger-Muller counter 3. The function of capacitor 5 consists in that, if the ammeter 4 has, for example, a scale division which is linear according to current, a scale division according to the number of pulses is obtained, which more closely approaches the logarithmic scale division. This is an advantageous factor if large doses must be measured. This behaviour can be explained in the following manner.

If the voltage of the voltage source, which is assumed to be constant, and the voltage of the capacitor are indicated by $E_0$ and $E_1$, respectively, the voltage $E_1$ will be substantially equal to the constant voltage $E_0$ if the number of pulses occurring per unit-time is small. The voltage at the counter 3 is then, as a rule, also equal to $E_1$. However, at the moment of discharge, the voltage at the counter decreases to $E_s$ and hence the starting or extinction voltage. The voltage $E_1$ at the capicitor is constant at constant radiation intensity.

If the number of pulses per unit-time is small, the charge transport per pulse is great. If the number of pulses per unit-time increases, $E_1$ finally approaches the extinction voltage $E_s$ of the tube, whereas the charge transport per pulse becomes very small. The voltage $E_1$ adjusts itself in such manner that the current carried off through the counter tube is compensated by the current supplied through the resistor 1.

It may be calculated that the current traversing resistor 1 may be written as follows:

$$I = \frac{E_0 - E_s}{R} \cdot \frac{nk}{1+nk}$$

Assuming that $$\frac{E_0 - E_s}{R} = I_0, \text{ then } \frac{I}{I_0} = \frac{nk}{1+nk}$$

wherein R is the value of the resistor 1, $n$ is the number of pulses per second and $k$ is a value which is dependent upon resistor R and the properties of the tube counter tube 3.

Figure 4:
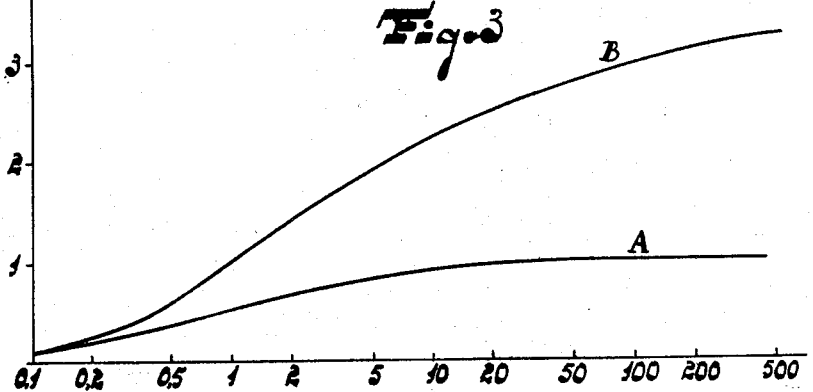
Fig. 4 is a graphical presentation of a curve to aid in explaining the operation of the circuit arrangement of the invention.

The curve A of Fig. 4 shows the current through the ammeter 4 as a function of $nk$ on a logarithmic scale.

It is approximately linear up to a determined value of $nk$, which is not very high.

Figure 2:
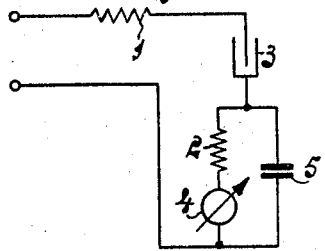
Fig. 2 is a schematic diagram of another embodiment of the circuit arrangement of the present invention.

In Fig. 2, identical elements are indicated by the same reference numerals. Here the parallel combination of resistor 2 and capacitor 5 is connected in series with the Geiger-Muller counter 3. The measuring instrument 4 is preferably included in the branch of resistor 2. In this case also, a substantially logarithmic division may be obtained for the lower part of the scale.

Figure 3:
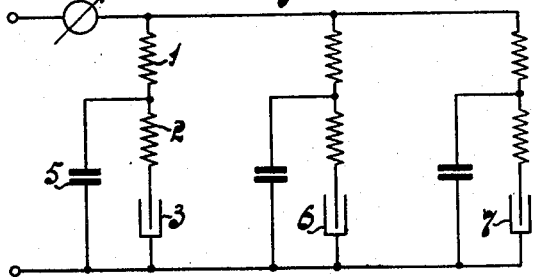
Fig. 3 is a schematic diagram of still another embodiment of the circuit arrangement of the present invention.

An improvement of this indication may be obtained by utilizing a plurality of counter tubes, all of which have approximately the same extinction voltage, but the values $k$ of which are different. Said tubes are connected in a similar manner as the tube 3 in Fig. 1, but a single ammeter only is provided for all the tubes. A circuit of this kind is shown in Fig. 3, which comprises the counter tubes 3, 6 and 7. The value $k$ of the second tube 6 may, for example, be equal to one tenth of the value $k$ of the tube 3, and the value $k$ of the third tube 7 may be one tenth of the value $k$ of the tube 6. For the mean current traversing the ammeter 4, in such a case, we then obtain the expression:

$$\frac{I}{I_0}=\left\{\frac{nk}{1+nk}+\frac{0,1\ nk}{1+0,1\ nk}+\frac{0,01\ nk}{1+0,01\ nk}\right\}$$

This current is shown graphically by the curve B in Fig. 4. It is linear up to a much higher value of $nk$ than the curve A. The plateau of the tube is required to be fairly large, since otherwise the voltage that can be applied to the tube would not be high enough. As appears from the formula, it is necessary for obtaining a reasonable current strength that the difference between the supply voltage and the extinction voltage should be great.

Use is preferably made of a halogene counter, of which the plateau between, for example, 300 and 1000 volts has a slope of about 1% per 100 volts.

While the inveintion has been described by means of specific examples and in specific embodiments, I do not wish to be limited thereto, for obvious modifications will occur to those skilled in the art wtihout departing from the spirit and scope of the invention.

What is claimed is:

1. A circuit for measuring radiation intensities comprising a series combination of a Geiger-Muller counter and an extinction resistor, means coupled to said series combination for indicating the mean current traversing said Geiger-Muller counter, a second resistor and a smoothing capacitor interposed between said series combination and said indicating means to effect a decrease in voltage at the terminals of said counter at increasing doses of radiation, and means for applying a potential to said counter through said resistors.

2. A circuit as set forth in claim 1, wherein said second resistor is connected in series with said series combination of said counter and said extinction resistor, and wherein said capacitor is connected in parallel with said series combination.

3. A circuit as set forth in claim 1, wherein said second resistor is conected in parallel with said capacitor, and wherein the parallel combination of said second resistor and capacitor is connected in series with said series combination.

4. A circuit as set forth in claim 1, further including a plurality of circuits each comprising said series combination of said Geiger-Muller counter and extinction resistor, said second resistor and said smoothing capacitor, each of the plurality of counters having different sensitivities, said plurality of circuits being connected in parallel, and said indicating means being a common indicating means connected to each of said plurality of circuits.

References Cited in the file of this patent

UNITED STATES PATENTS

| | | |
|---|---|---|
| 2,405,572 | Friedman | Aug. 13, 1946 |
| 2,469,383 | Gibbs et al. | May 10, 1949 |
| 2,506,435 | Rossi et al. | May 2, 1950 |
| 2,617,043 | Hepp | Nov. 4, 1952 |
| 2,701,312 | Lord | Feb. 1, 1955 |

OTHER REFERENCES

Electron and Nuclear Counters, a text by Serge A. Korff, published by T. Van Nostrand Co., Inc., in 1946, pages 156–158.

Radiation Instruments Using Geiger, by Paul Weisz, Electronics, October 1942, pages 44–48, and 118.